Jan. 22, 1929.
H. M. SHIELDS
1,699,995
APPARATUS FOR PEELING FRUIT
Filed July 7, 1925     8 Sheets-Sheet 1
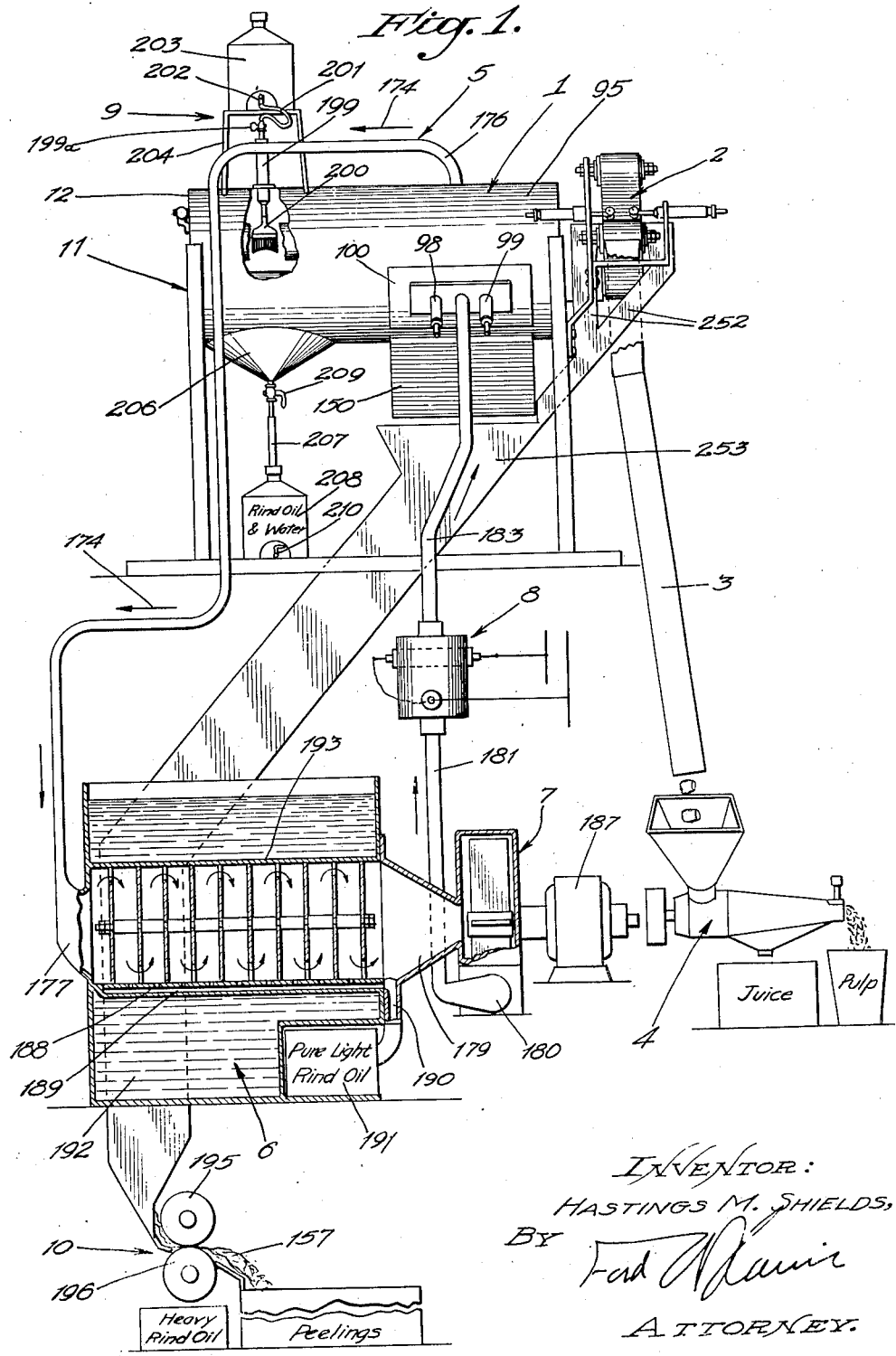
Fig. 1.
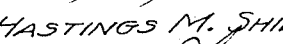
INVENTOR:
HASTINGS M. SHIELDS,
BY
ATTORNEY.

Jan. 22, 1929.  1,699,995
H. M. SHIELDS
APPARATUS FOR PEELING FRUIT
Filed July 7, 1925   8 Sheets-Sheet 6
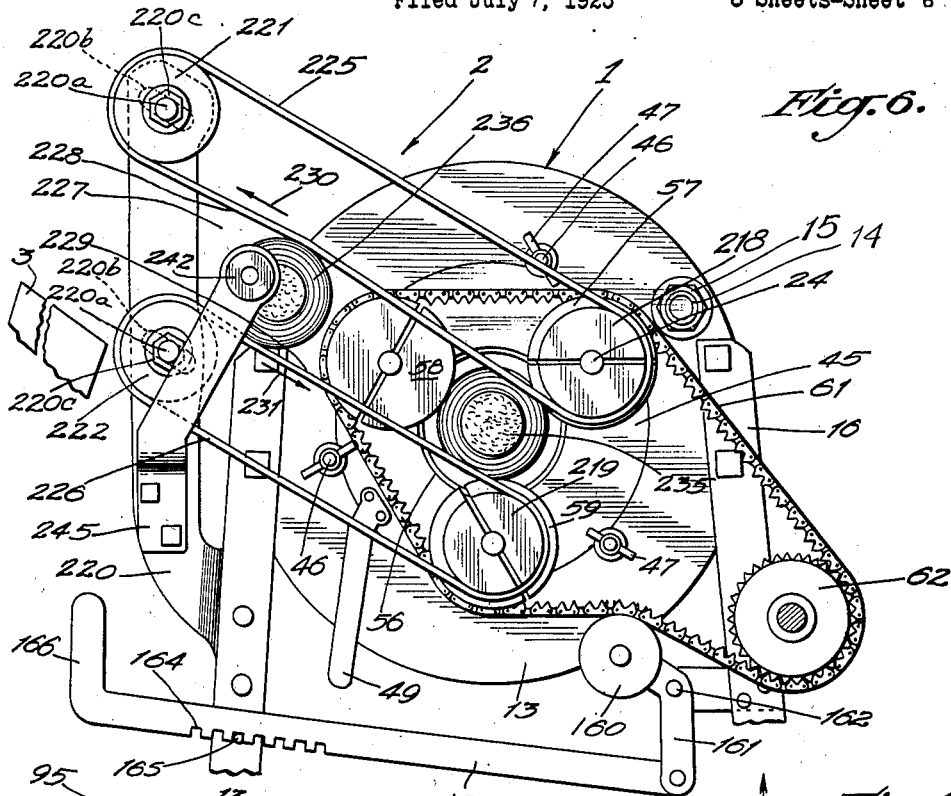
Fig. 6.
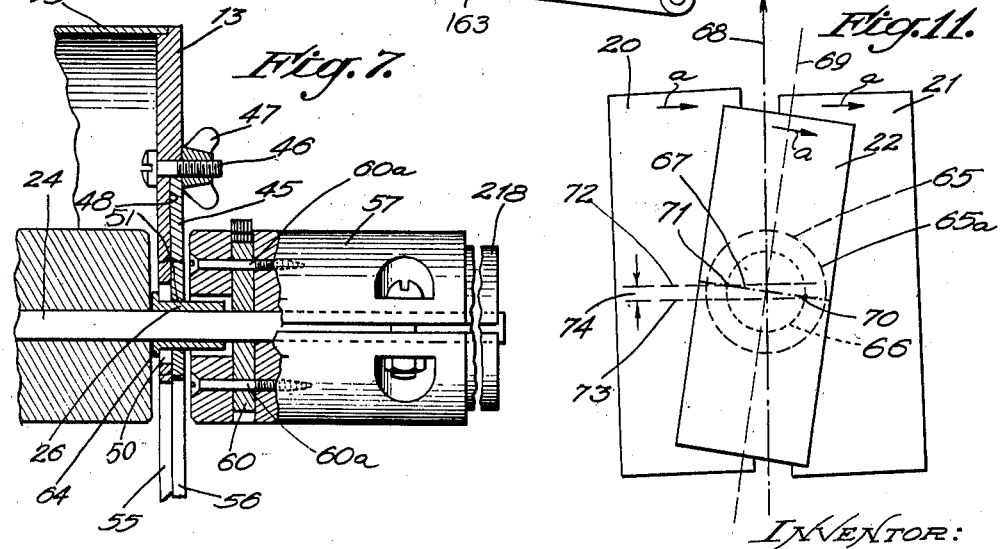
Fig. 7.   Fig. 11.
INVENTOR:
HASTINGS M. SHIELDS,
BY
ATTORNEY.

Jan. 22, 1929.
H. M. SHIELDS
1,699,995
APPARATUS FOR PEELING FRUIT
Filed July 7, 1925    8 Sheets-Sheet 7
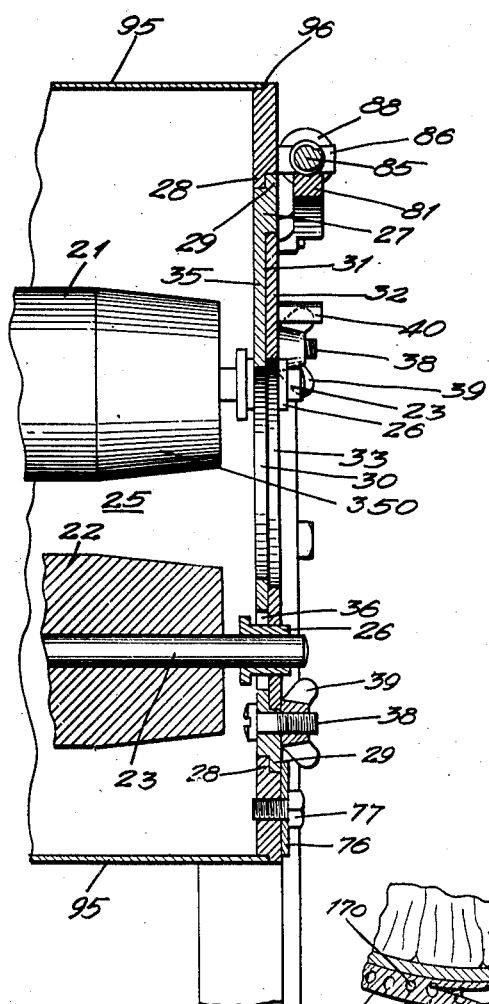
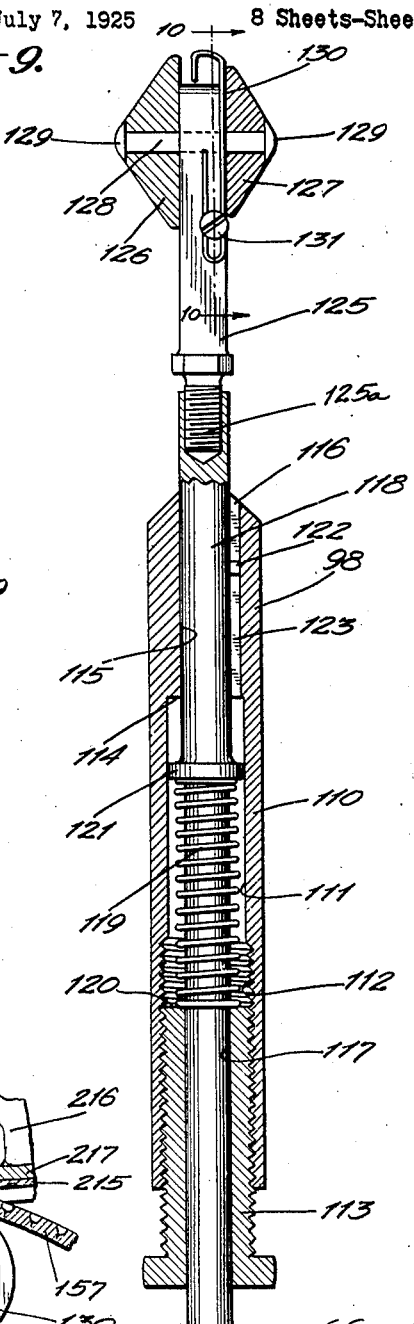
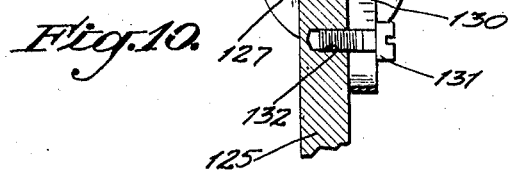
INVENTOR:
HASTINGS M. SHIELDS,
BY
ATTORNEY.

Jan. 22, 1929.
H. M. SHIELDS
1,699,995
APPARATUS FOR PEELING FRUIT
Filed July 7, 1925   8 Sheets-Sheet 8
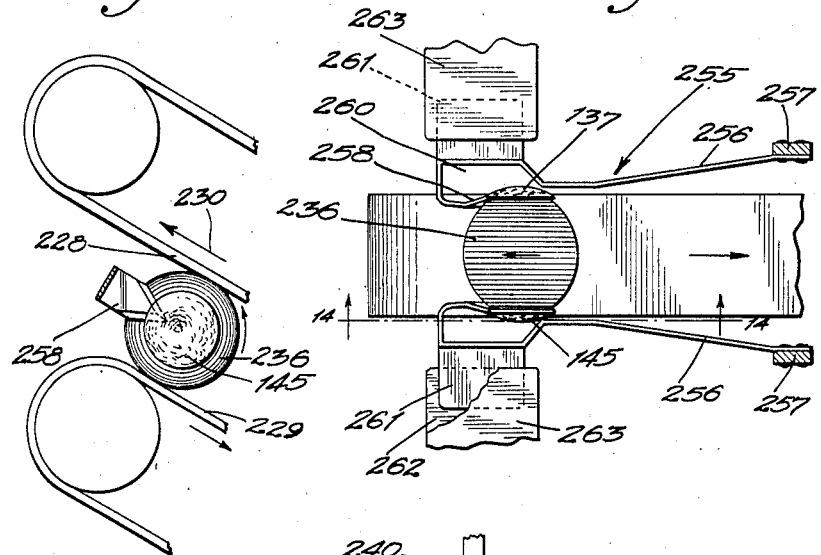
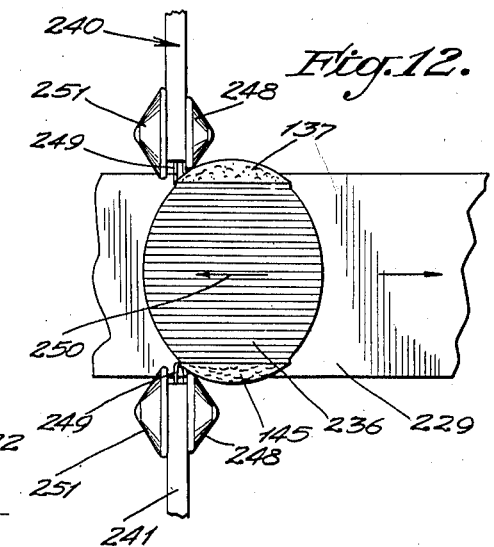
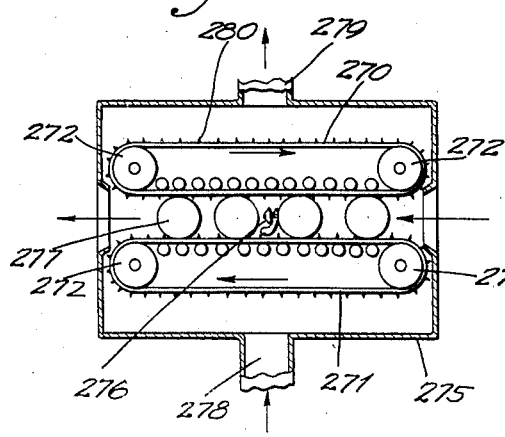
INVENTOR:
HASTINGS M. SHIELDS,
BY
ATTORNEYS.

Patented Jan. 22, 1929.

1,699,995

UNITED STATES PATENT OFFICE.

HASTINGS M. SHIELDS, OF LOS ANGELES, CALIFORNIA.

APPARATUS FOR PEELING FRUIT.

Application filed July 7, 1925. Serial No. 42,026.

My invention relates to an apparatus for peeling vegetables and fruit. My invention in the ensuing specification will be described as used in connection with the separation of oranges into their component parts.

Oranges have constituent parts which are valuable if they are properly derived. The juice of the orange makes a delicious drink if it is freed of the rind oils, the outer portion of the rind is valuable for marketing in the form of marmalade and candied rind, the volatle rind oils in isolation are valuable for making flavor extracts, and the secondary or inner rind consisting of the white substance beneath the outer or colored rind contains pectin which is useful in jellifying fruit juices. To my knowledge there is no apparatus which efficiently separates all of the valuable constituents of oranges and therefore considerable of these valuables are wasted.

It is an object of my invention to provide an apparatus for peeling oranges so as to prepare them in suitable condition for subsequent squeezing and in such a manner that the rind will be removed in ribbons or strings so that it is suitable for use in marmalade and candied form.

It is a further object of my invention to provide a machine having rollers so arranged as to feed oranges continuously in a given direction so that the operations to derive the constituents thereof may be performed on the oranges.

It is a still further object of my invention to provide a machine of this character in which the rollers may be adjusted in order to change the rate of speed at which the oranges progress therethrough.

It is also an object of my invention to provide in a machine of this character rollers which are adjustable so as to accommodate various sizes of oranges.

It is also an object of my invention to provide a machine in which oranges are revolved and fed past knives which remove the outer rind from the oranges in the form of ribbons or strings.

It is another object of my invention to provide a machine of the character mentioned having knives which follow the contour of the orange.

It is another object of my invention to provide a machine of the character mentioned having knives which are provided with guide rollers for guiding them along the contour of the orange.

It is an additional object of my invention to provide a machine of the character mentioned having knives which are arranged to cut the rind through the oil sacs thereof in such a manner as to free the volatile oils therefrom.

It is an object of my invention to provide an apparatus for washing the exterior of an orange while it is being rotated and fed between a plurality of rotating rollers.

It is another object of my invention to provide a means for continuously rotating an orange in a given direction and concurrently feeding the orange in a direction perpendicular to the axis of rotation for the purpose of performing an operation upon the orange.

It is a further object to provide a pair of parallel belts moving in opposite directions at different speeds for the purpose of rotating and feeding an orange along a given path.

It is yet another object of my invention to provide a mechanism for removing opposite end portions of the rind of an orange, the intermediate portion of the rind having previously been removed.

It is a still further object of my invention to provide a peeling machine having a feeding mechanism in which the objects fed are rotated between a plurality of substantially parallel rotating rollers, a seres of points to project outwardly from the surface of said rollers to grip the objects fed.

An object of my invention is to provide a turning knife guide which will gauge the depth to which the knife will turn the outer surface from a vegetable or fruit rotated and fed past the turning knife.

Further objects and advantages of my invention will be apparent in the following specification and the accompanying drawings, in which:

Fig. 1 is a diagrammatic view of the apparatus employed in carrying out the complete process herein described.

Fig. 6 is a rear elevational view showing the belts for rotating and feeding the oranges for the removal of buttons of rind left on their opposite ends.

Fig. 7 is a sectional view illustrating the rear end journal of one of the rollers and the mounting of a driving pulley upon the trunnion of the roller.

Fig. 8 is a vertical sectional view taken on line 8—8 of Fig. 3, and clearly illustrating the manner of locking the front radial adjustment disc by means of bolts having wing nuts.

Fig. 9 is a longitudinal sectional view of the yieldable mounting for the cutting elements of my invention.

Fig. 10 is a sectional view on line 10—10 of Fig. 9, illustrating the cutting elements of my invention in section and showing a fragmentary sectional view of a citrus fruit engaging the cutting element in cutting relationship.

Fig. 11 is a diagrammatic view illustrating the mechanism of my invention by which an object is both rotated and fed in a longitudinal direction between a plurality of rotating rollers.

Fig. 12 is a fragmentary view illustrating the engagement of end removing knives with end buttons of rind on an orange for the removing of the same.

Fig. 13 is a diagrammatic view similar to Fig. 12 and illustrating a modified form of end button removing knives in cutting relation to an orange, being rotated and fed therebetween.

Fig. 14 is a diagrammatic view taken on line 14—14 of Fig. 13.

Fig. 15 is a diagrammatic view illustrating a belt rotating and feeding mechanism provided with a housing and means for releasing and capturing rind oils therein.

Figure 2:
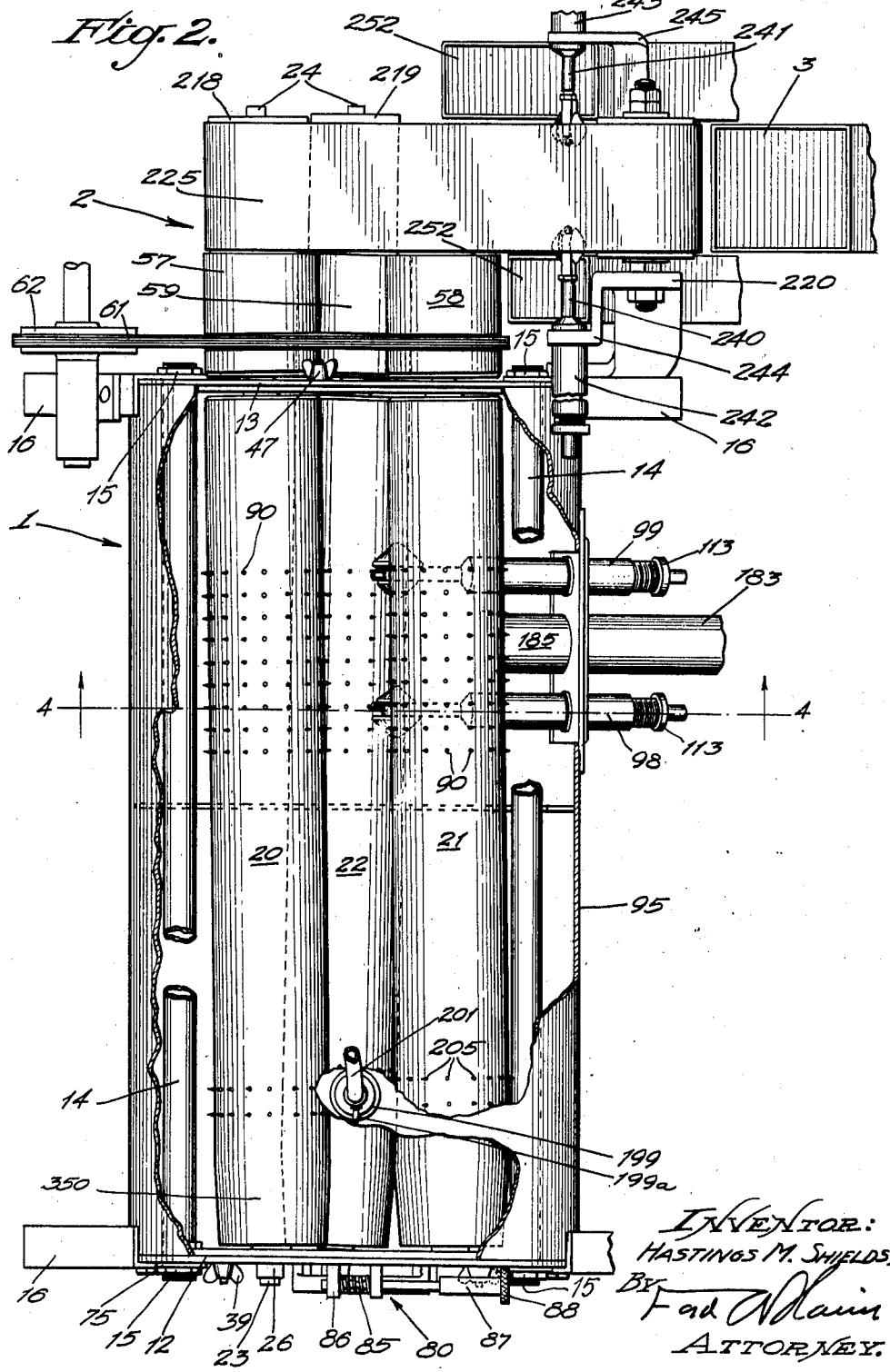
Fig. 2 is a plan view of the peeling machine of my invention with the housing thereof broken away to show the rollers, for rotating and feeding the oranges, in twisted relation about the central space which is the path of the oranges fed by the rollers.

The form of the complete apparatus as shown in the drawings and as illustrated diagrammatically in Fig. 1, comprises broadly an orange peeling machine 1 through which an orange or other citrus fruit is fed for removing therefrom a band of outer rind intermediate of the opposite end portions. An end button remover 2 is provided to receive the orange as it emerges from the peeling machine 1 and peel the outer rind end buttons therefrom. This causes the complete uncovering of the pectin bearing white substance herein termed the secondary rind. Inside this, the pulpy interior juice bearing structure is contained unpunctured. This is a very important feature of the present invention in that the oils released in the process of removing the rind are not mixed with the juice of the inner structure of the orange.

A chute 3 conveys the orange denuded of outer rind to a juice extractor 4 where the juice is removed from the remaining solid matter in the orange. This solid matter consisting of desiccated pulp and secondary rind is then in excellent condition for submission to the chemical process for removing the pectin therefrom.

Means for capturing the rind oils, released in the peeler 1, are provided in the air circuit 5 which include the confined space in the peeler 1, a condenser 6, a fan 7 and an air heater 8. The manner of operation of this air circuit 5 will be described later. A water circuit 9 is provided as an auxiliary to the air circuit to capture a certain grade of rind oil, removed by the mechanism provided in the peeler 1, and will be described later. A pressure oil extractor 10 is used to extract the oil remaining in the orange rind after it has been peeled from the orange in the peeler 1 and in the end remover 2.

The peeling machine 1 comprises a frame 11 having end members 12 and 13 which are rigidly spaced by spacing tubes 14, these being rigidly secured at their opposite ends by nuts 15 to the end members 12 and 13. Legs 16 are secured to the end members 12 and 13 by means of cap screws 17 and extend down to a suitable base, not shown, upon which they are rigidly secured. Rollers 20, 21 and 22 are rotatably mounted between end members 12 and 13 upon trunnions 23 and 24 of the rollers. These rollers are arranged to be disposed substantially in parallelism to, about, and in confining relation to, a central space 25. This space 25 in the present construction extends from the end member 12 to the opposite end member 13. Access to the end members 12 and 13 to and from through end members 12 and 13 to and from this space is provided as will be described later. This space 25 forms a pathway along which fruits or vegetables may be fed for the purpose of turning a portion of the outer surface therefrom. In order to accommodate different sizes of fruit or vegetables this space 25 between the rollers 20, 21 and 22 may be enlarged or decreased by means for radially adjusting the rollers at their opposite ends. This radial adjustment is accomplished at the front end of the rollers, as illustrated in Fig. 3.

Figure 3:
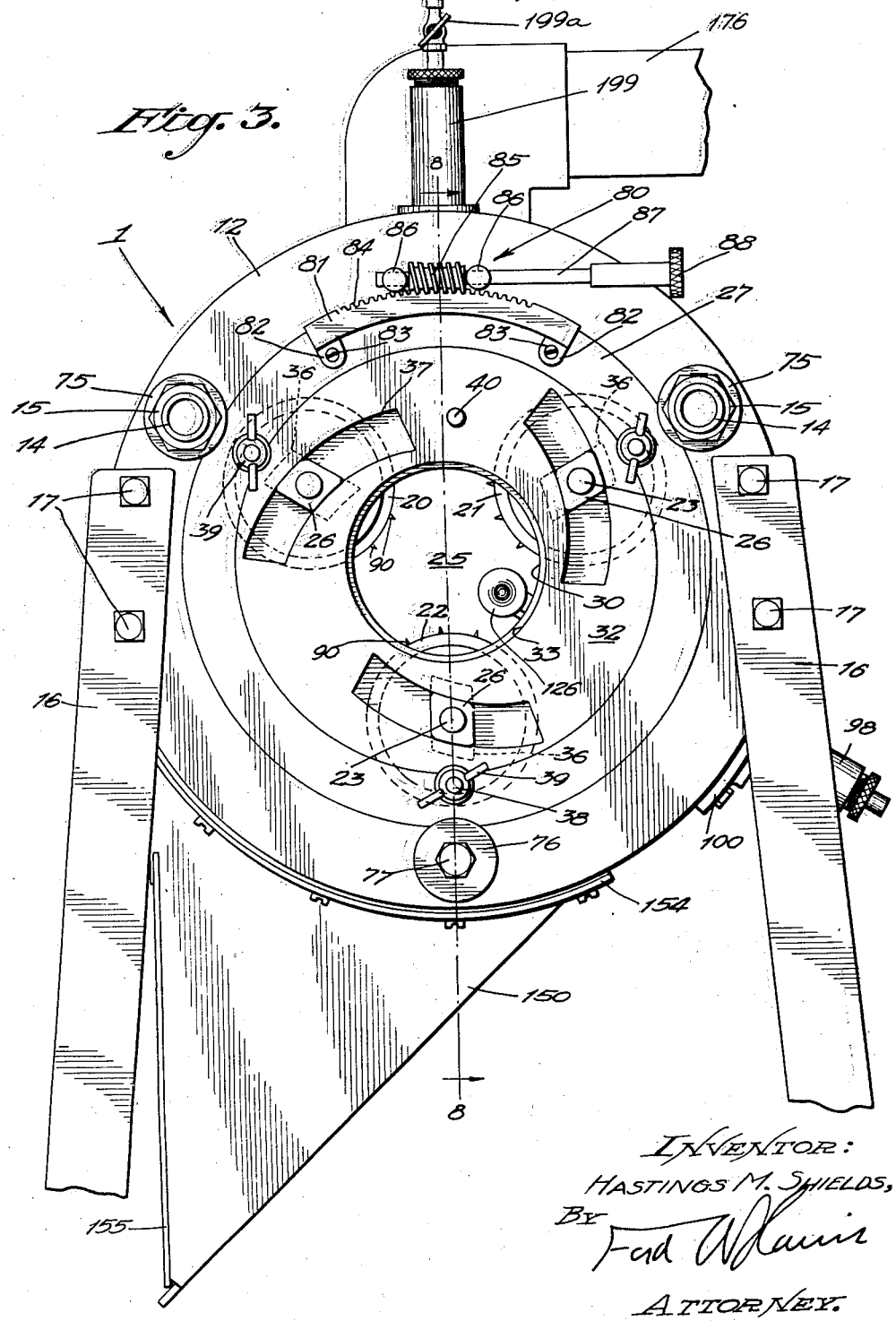
Fig. 3 is a front end view of the peeling machine illustrating the circumferential and radial adjusting means for the front end journals of the rollers.

Referring to Fig. 3 and Fig. 8, it will be seen that a circumferential adjusting plate 27, the purpose of which will be described later, is seated concentrically in the end plate 12 by an annular shoulder 28 formed on the end plate 12, the outer rim of the circumferential adjusting plate 27 being recessed to provide an annular shoulder 29 of thickness complementary to shoulder 28 so that the circumferential adjusting plate 27 is seated in the same plane with the end plate 12. The circumferential adjusting plate 27 is provided with a central aperture 30 opposite the front end of the central space 25. The front face of the plate 29 is concentrically turned away to provide a seat 31 in which is rotatably mounted a radial adjustment plate 32. This radial adjustment plate 32 has a central opening 33 which is slightly larger than the aperture 30, and together therewith affords a front entrance to space 25.

In the inner portion 35 of the circumferential adjusting plate 27, radial slots 36 are formed for receiving front journal bushings 26. Spiral slots 37 are formed in the radial adjusting plate 32 so as to fit over the journals 26 when the plate 32 rests upon its seat 31, these slots 37 cooperating with the slots 36 to control the radial movement of the journal bushings 26 relative to the circumferential adjusting plate 27.

In the present instance the rollers and the slots 36 and the slots 37 are shown as all disposed radially in an equiangular relationship from the approximate center of the central space 25.

Bolts 38 extend through suitable apertures in the circumferential adjusting plate 27, these apertures being disposed adjacent to the outer edge of the seat 31. Wing nuts 39 are screwed down upon the bolts 38 so as to bear against the outer surface of the radial adjustment plate 32 and prevent relative motion between the radial adjustment plate 32 and the circumferential adjustment plate 27. When it is desired to adjust the rollers outwardly at their front ends the wing nuts 39 are loosened on the bolts 38 to release the plate 32 for rotation upon the plate 27. The plate 32 is rotated manually the desired amount by means of a finger 40 which is mounted upon the outer face of the plate. As the different portions of the slots 37 are disposed a varying distance from the center of the plate 32, rotation of the plate 32 to the right will force the journal bushings 26 outwardly in slots 36, while rotation to the left of the plate 32 from the position shown will force the journals 26 inwardly in the slots 36. The desired adjustment having been made, wing nuts 39 are turned down by bolts 38 against the face of plate 32 binding this plate to the circumferential adjusting plate 27.

Radial adjustment at the rear end of the peeler is provided for in the same manner as that just described for the front end, the only difference being that the rear radial adjustment plate 45 is seated directly in the rear frame end member 13, there being no circumferential adjustment plate at the rear end. Bolts 46 having wing nuts 47 lock the radial adjustment plate 45 to the rear frame end member 13 and when these are loosened the plate 45 may be rotated in the seat 48, provided therefor in the rear frame member 13, by means of a handle 49 rigidly secured to the face of the plate 45, and depending downwardly, as illustrated in Fig. 6, beyond the periphery of the rear frame end member 13. Radial slots 50 are provided in the face of the seat 48 in the rear end member 13. These slots 50 receive rear journal bushings 26 in the same manner in which slots 36 receive front journal bushings 26. Spiral slots 51 are formed in the rear radial adjustment plate 45 in the same manner as slots 47 are formed in the front radial adjustment plate 32 and operate, upon a turning of the plate 45, to radially adjust the rear journals 26 in the slots 50 in the same manner as the slots 37 serve to radially adjust the front journals 26 in the radial slots 36.

Figure 4:
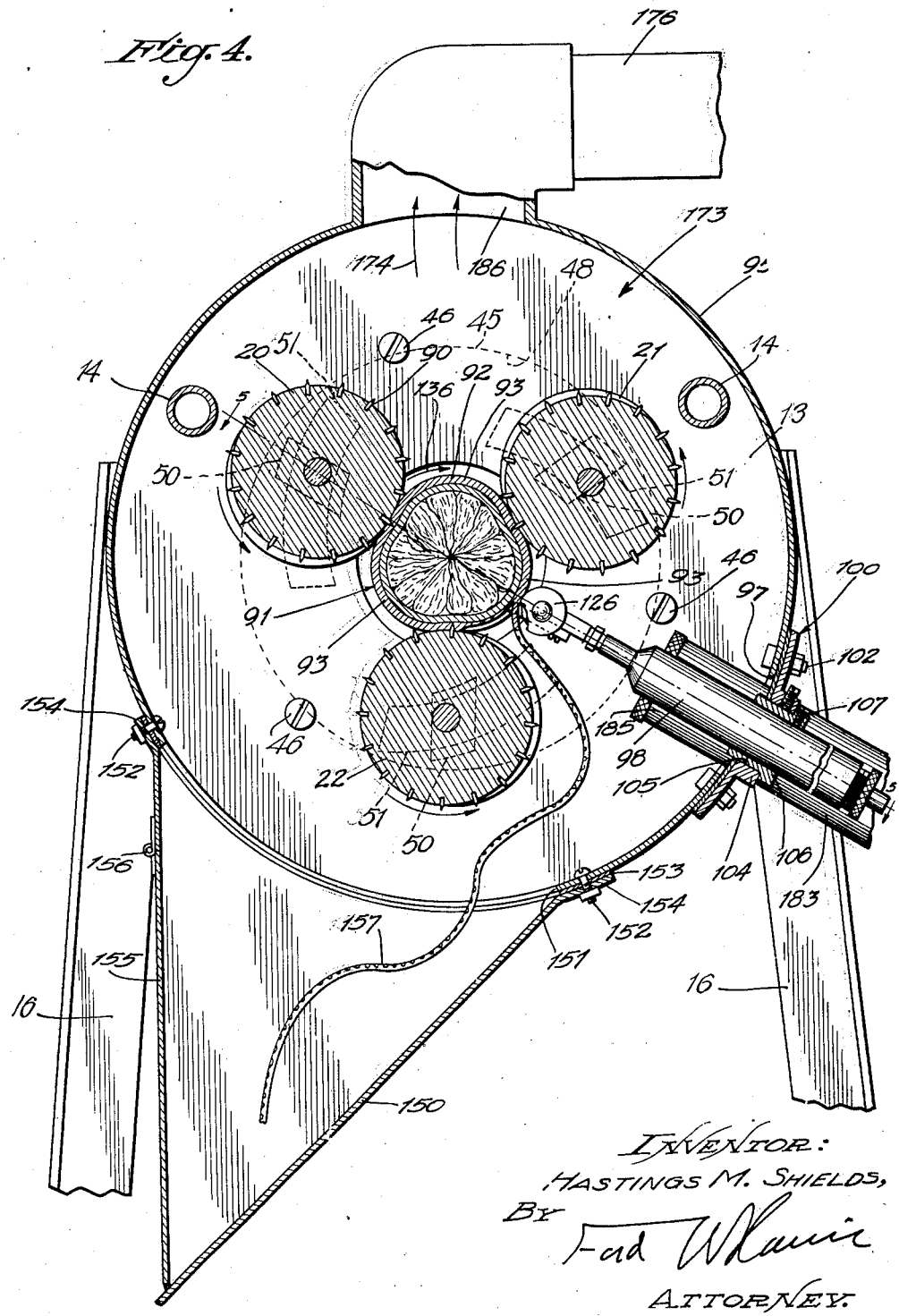
Fig. 4 is a vertical, sectional view taken on the line 4—4 of Fig. 2, illustrating a sectional view of an orange fed between the rollers and engaged by a cutting element for the turning of the rind from the orange.
Figure 5:
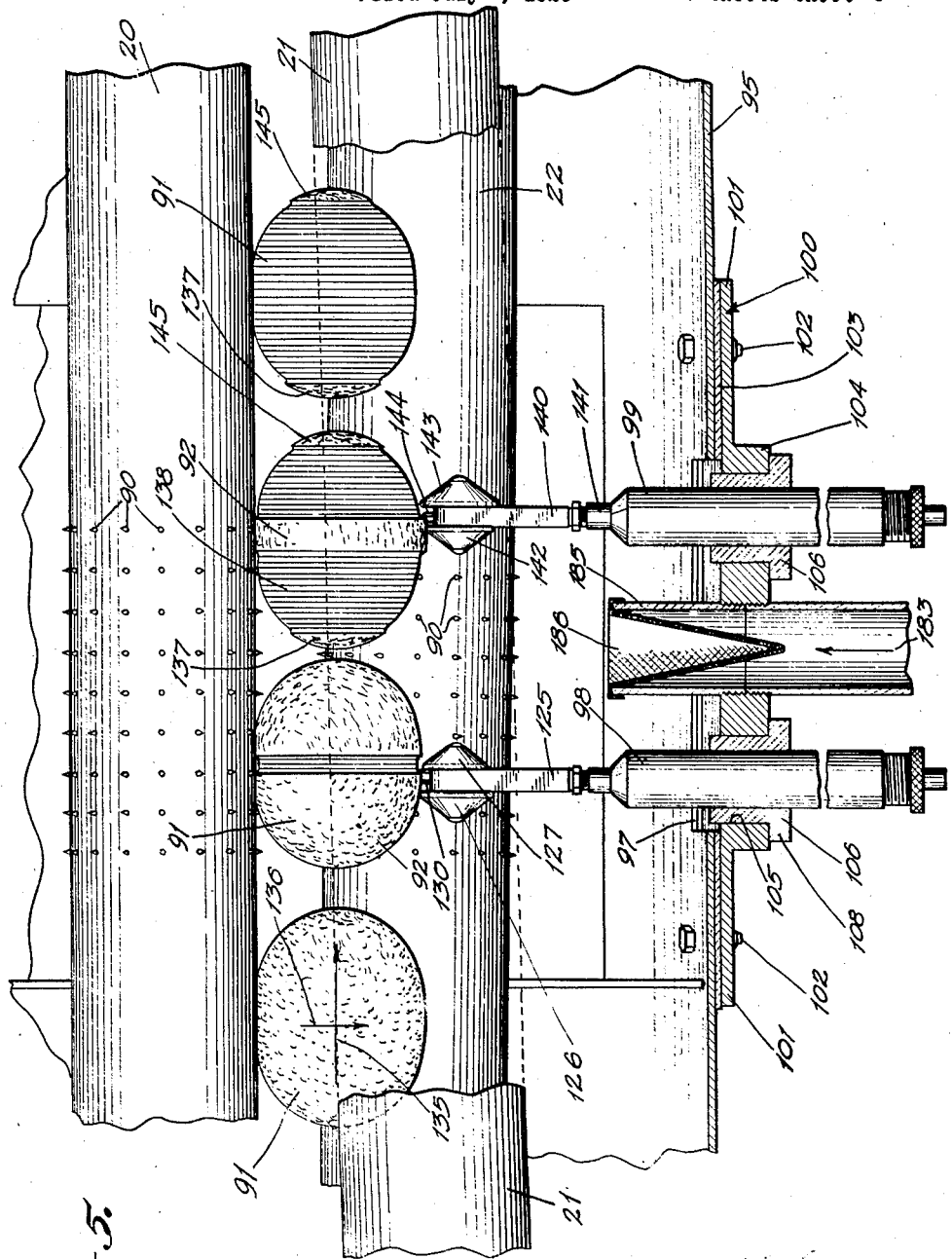
Fig. 5 is a sectional view taken on line 5—5 of Fig. 4, illustrating in plan the operation of a pair of cutting elements in removing the outer rind of a series of oranges as they are fed past these cutting elements between the rollers of my invention.

As will be seen by reference to Fig. 4, where an orange is illustrated as being engaged by rollers 20, 21 and 22, for the rotation of the orange for the purpose of turning a portion of the rind therefrom, the rollers are disposed in confining relation to the space occupied by the orange. By this is meant that this space 25 is so delimited by said rollers that when an object is fed into said space so as to be engaged by said rollers, the position of the rollers will prevent the object leaving said space by any other way than at the ends thereof.

In order that an orange may be thus fed lengthwise through the space 25, the journal bushings 26 at the front end of the machine are adapted to be shifted circumferentially in the same direction in order that the axes of rollers 20, 21 and 22 may bear twisted relation to the axis of the central space 25. In other words, the axes of the rollers 20, 21 and 22 will be deflected from parallelism with each other and with the axis of the confined space 25. This deflection, as illustrated in Figs. 2, 4, 5 and 11, results in the feeding of objects, introduced into the front end of space 25, through the space 25 and out of the rear end thereof. On passing through the rear end openings 55 and 56 the object fed is engaged by pulleys 57, 58 and 59 which are mounted on the rear trunnions 24 of the rollers 20, 21 and 22, respectively. These pulleys are of the same diameter as the rollers. Upon thus being engaged by pulleys 57, 58 and 59 the feeding action is continued until the object reaches the outer end of said pulleys and moves out of engagement therewith. Journals 26, where they pass through the radial and spiral adjustment slots engaging them, have flat faces which engage the walls of these slots and prevent the journal bushings 26 from rotating in the slots. The pulleys 57, 58 and 59 are each divided into two parts, as illustrated in Fig. 7, to receive a sprocket 60, secured therebetween by screws 60ª. The sprockets 60 are of the same outside diameter as the pulleys 57, 58 and 59 and therefore do not alter the feeding action between the pulleys. The sprockets 60 are engaged by a silent chain 61 which passes around the group of pulleys 57, 58 and 59 and a power driven sprocket 62, from which it transmits an equal speed of rotation to the sprockets 60 and thence through the pulleys to the roller trunnions 24 and the rollers 20, 21 and 22. A flange 64 is formed on the inner end of the journal bushings 26 to prevent the bushings working outwardly between the adjusting slots with which it is in engagement.

In Fig. 11 is to be found a diagrammatic illustration of the principle involved in the roller mechanism for feeding objects along a given path as embodied in the peeling machine of my invention. In this figure the three rollers 20, 21 and 22 are viewed from a position beneath the roller 22. An object 65 centered between these rollers is indicated by the dotted line 65ª. The surface of contact between this object 65 and the roller 22 is bounded by a dotted line 66. The path of a given point on the roller 22, during its rotation, is indicated by the dot-dash line 67. The axis and direction of travel of the objects 65 along the path confined between the rollers 20, 21 and 22 is shown by the arrow, dot-dash line 68. The axis of the roller 22 is indicated by the dash line 69. All points on the surface of the roller 22 will describe paths similar to the circle indicated by the line 67, during the rotation of the roller in the direction of the arrow a.

The portion of the line 67 included in the space of contact confined by the dotted line 66 represents the line of travel during contact between this point and the object 65 in a single rotation of roller 22. Numeral 70 indicates the position of first contact of this given point with the object 65. Numeral 71 indicates the last position of contact of the given point with the object 65. Dash lines 72 and 73, perpendicular to the axis 68, which it will be remembered is the only direction in which translation of the object 65 is possible, are passed through points 70 and 71, respectively. It will be seen that in the passage from 70 to 71 the point of contact between the roller 22 and the object 65 has moved a distance 74 in the direction of the arrow head upon the line 68. Thus, as the given point is representative of all points on the surface of the roller 22, it will be seen that all points of contact between the rollers 20, 21 and 22 with the object 65 leave contact there with the distance 74 farther along the axis 68 than when these points meet the object 65. This movement of all points of contact between roller 22 and the object 65 along the line 68 in the direction of the arrow head thereon, as well as in a rotational direction about the axis 69 of the roller 22, causes both a rotation of the object 65 and a feeding of this object in the direction of the axis 68 of the space between the rollers.

The primary purpose of providing this rotating and feeding mechanism in the present invention is for the feeding of fruit or vegetables past turning knives for the purpose of removing a portion of the outer surface of the fruit or vegetables.

It is to be understood that I claim protection upon the use of the above described mechanism for feeding any object of whatever nature along a given path where rectilinear and rotational motion are concurrently desired for any purpose. For instance, it is within the scope of the present invention to provide rollers 20, 21 and 22 of a resilient substance and to utilize these rollers for the feeding of hard objects along a path in the same manner as fruit or vegetables are fed in the embodiment herein illustrated. When the rollers are thus formed of resilient material they may well be adapted for propelling steel balls along a given path for polishing or for feeding any objects as a part of any process in which this action is necessary.

The present embodiment, while requiring but slight changes for use in peeling the surface from any kind of vegetable or fruit in which such peeling becomes necessary in the canning or preservation thereof as food, is particularly constructed for the purpose of turning the portion of the outer rind from oranges and other citrus fruits as a step in a process for separating the citrus fruit into its constituent parts and component elements which are a great many times more valuable when separated than is the fruit before such separation.

The angles of divergence of the axes or rollers 20, 21 and 22 from parallelism with the axis of space 25 are controlled in the present invention so that these angles of divergence are equal. This is accomplished by the mounting of the circumferential adjustment plate 27 for rotation in the frame end member 12. As previously described, the plate 27 is seated in the frame end member 12 so as to lie flush with the outer surface thereof. Washers 75 are placed over the ends of spacing tubes 14 after these project through suitable apertures in end members 12 and before outside securing nuts 15 are screwed on these ends. These washers 75 project over the outer edge of the plate 27 at opposite points of the upper half of the periphery thereof. Cooperating with washers 75 to retain the plate 27 in its seat is a washer 76, disposed opposite the bottom of the plate 27 and held in overlapping relation with the edge of the plate by a cap screw 77 which passes through the hole of washer 76 and is threadedly received in a tapped hole in the frame end member 12. While washers 75 and 76 retain plate 27 against removal from its seat, this plate is free to rotate in its seat so as to cause a circumferential shifting of the front end journal bushings 26 about the axis of the space 25. This circumferential shifting of the front end journal bushings 26 results in the divergence from parallelism of the axes of the rollers 20, 21 and 22, so as to cause objects introduced into this confined space between these rollers to be fed along this space in longitudinal direction relative to the rollers. The principle of operation of this feeding was described above with reference to Fig. 11, and it will be seen, by again referring to this figure, that the greater the angle of divergence of the axes 69 of the rollers from parallelism with the axis 68 of the space 25, the greater the distance 74 which, objects 65 will be fed forwardly in a single rotation of the rollers and hence the faster the objects will be fed for a given speed of rotation of the rollers.

The degree of this divergence of the axes of the rollers is determined by the amount of rotation of the plate 27 from the position of said plate in which the axes of the rollers 20, 21 and 22 are in parallelism. Circumferential adjustment of plate 27 is provided for in a worm and sector mechanism 80. In this mechanism the gear sector 81 is provided with lugs 82 which are secured by screws 83 to circumferential adjusting plate 27 so that the toothed periphery 84 of the sector 81 is disposed along the upper edge of plate 27 concentrically with this plate. A worm 85 having threads to match with the toothed periphery 84 of the sector 81 is suitably journaled in studs 86 provided upon the surface of the frame end member 12 so as to operatively engage with the toothed periphery 84 of the sector 81. Integral with the worm 85 and extending through and beyond one of the studs 86 is a stem 87 provided with a thumb wheel 88 by which the worm 85 may be manually rotated to effect a circumferential movement of sector 81 which causes rotation of the plate 27. Thus, it will be seen that by rotation of the wheel 88 any degree of divergence of the axes of the rollers 20, 21 and 22 may be obtained within the limits of the structure and a consequent control of the speed with which objects may be fed along the path 25 may thereby be obtained.

In using the above described mechanism for rotating and feeding oranges or other citrus fruits past cutting elements for the purpose of removing the outer surface of the rind therefrom, oils residing in the rind are released by the cutting thereof and means are provided for capturing these oils. As it is desirable to remove as much of the oil from the rind at the time of the rind cutting operation, separate means are provided for puncturing the rind a great number of times during this cutting operation so as to cause the releasing of a much larger portion of the oils residing in the rind than would otherwise occur.

This means for puncturing the rind of the orange during its feeding movement comprises a large number of sharply pointed needles 90 which are set in the surface of the rollers 20, 21 and 22 opposite the zone where the cutting of the rind takes place. These points 90 project about one-sixteenth inch above the surface of the rollers and during the passage of the orange through the cutting zone it is estimated that these points pierce the rind of each orange approximately 71,000 times.

By reference to Fig. 4 it will be seen that the orange 91, herein illustrated in section, is engaged by the rollers 20, 21 and 22. At the point of contact between the orange and the rollers the surface of the orange is slightly depressed inwardly. This causes an outward bulge or stretching of the ring 92 of the orange 91 at the points 93 where the rollers do not engage the orange. It will, therefore, be seen that the rind 92 is compressed during the puncturing thereof by needle points 90 and that immediately after leaving engagement with the rollers by which it has just been punctured the rind is bulged or stretched. This alternate puncturing under pressure, and outward bulging of the rind when released from pressure, causes the release of a large portion of the oils residing in the rind. The means of capturing the oils thus released will be described hereinafter.

The first step in the removal of the rind from the orange is accomplished by a turning of the outer surface of the rind from all of the orange excepting buttons at the opposite ends thereof. This turning takes place during the feeding of the orange between the rollers 20, 21 and 22 in the cutting zone opposite the needles 90. The operation of this turning process may be understood by reference to Figs. 4 and 5. In the process of recovering the rind oils released during the feeding of the orange through the cutting zone it is necessary that the space in which the rollers are mounted be confined. For this reason a cylindrical housing 95 is provided, the ends of which meet and are mortised in the periphery of the frame end members 12 and 13 as indicated at 96 to form a tight joint therebetween.

Opposite the cutting zone an opening 97 is provided in the housing 95 through which knife holders 98 and 99 project. These knife holders in the present instance are cylindrical in form and project inwardly on a line which substantially bisects the radial angle formed by lines passing from the center of the space 25 through the axes of the rollers 21 and 22. A mounting plate 100 covers the opening 97 and has flanges 101 which overlap the housing around the opening 97 and are secured to said housing by bolts 102. In order to render tight the joint between this plate 100 and the housing 95, packing 103 may be disposed between the outer surface of the housing 95 and the inner surface of the flanges 101. A boss 104 is formed on the plate 100, this boss having holes 105 therein for receiving bushings 106 which are apertured to snugly receive knife holders 98 and 99. Bushings 106 are secured in place on knife holders 98 and 99 by set screws 107 which pass through flanges 108 formed on the outer ends of bushings 106 for the purpose of limiting the inward movement of said bushings in holes 105. Bushings 106 remain secured to knife holders 98 and 99 when the latter are removed. Set screws 109 provided in the boss 104 engage bushings 106 to retain these removably in place in holes 105.

For a detailed description of knife holders 98 and 99, which are identical in structure, reference is had to Fig. 9 which shows knife holder 98 in section. Both knife holders are alike in construction. In the knife holders an outer body 110 is provided with a bore 111 at the outer end, this bore being threaded as indicated at 112, to receive a threaded tension adjustment plug 113. The bore 111 extends inwardly into the body 110 to a shoulder 114. The shoulder 114 is disposed between the bore 111 and a smaller bore 115 formed concentrically with the bore 111 between the shoulder 114 and the head end 116 of the body 110. Adapted to slide snugly through the bore 115 and a bore 117, concentrically formed in the plug 113, is a plunger rod 118. The plunger rod is adapted to be urged inwardly by a compression spring 119 which is disposed within the bore 111 about the plunger rod 118. The lower end of the spring 119 rests against the upper face 120 of the adjustment plug 113 and the upper end of the spring 119 engages a shoulder 121 formed on the plunger rod 118 and adapted to be urged inwardly by the spring 119.

A pin 122 provided upon the upper portion of the plunger 118 slides in a groove 123 formed in the wall of the bore 115, thus permitting longitudinal movement of the plunger 118 with respect to the body 110, but preventing rotation of the plunger 118. In the illustration in Fig. 9 the plunger rod 118 is shown depressed so that the shoulder 121 is out of engagement with the shoulder 114.

A plunger head 125 is threadably received at 125$^a$ into the inner end of the plunger rod 118. On the outer end of the plunger head 125 is mounted an advance guard roller 126 and a rear guard roller 127. These rollers are mounted on a single axle 128 which passes through a suitable aperture in the end of the plunger head 125 and is suitably capped at the ends 129 thereof to retain the rollers 126 and 127 in place.

On the plunger head 125 secured on knife holder 98, which is illustrated in Fig. 9, advance guard roller 126 is of slightly larger diameter than rear guard roller 127. A loop knife or cutting element 130 is secured, as shown, by a set screw 131 which passes through the loop knife at the rear end thereof and is screwed into a tapped hole 132 in the plunger head 125, as illustrated in Fig. 10. As will be seen, the knife 130 in this instance is disposed on the right hand side of the plunger head 125 adjacent to the rear guard roller 127. It will also be seen that the outer loop cutting edge of the loop knife 130 projects outwardly approximately an equal distance to the periphery of the advance guard roller 126. This relation between the knife and advance guard roller of the cutting element first engaged by the orange as it is fed in the direction of the arrow 135 and rotated in the direction of the arrow 136 is for the purpose of causing the knife 130 to be withheld from cutting relation with the rind of the citrus fruit 91 until this knife shall have passed beyond the first half of the surface of the orange 91. When the orange first engages the advance guard roller 126 the rotation of the orange rotates the roller 126 engaged therewith and the feeding of the fruit forwardly causes the advance guard roller 126 to ride outwardly on the forward face of the fruit compressing the spring 119 and causing the plunger head 125 to move from extreme inward position where the roller 126 first contacted the orange 91 to a position where the roller 126 rolls upon the rind of the orange at its greatest diameter. At this point the loop knife 130 comes into engagement with the rind of the orange 91 and commences by virtue of the rotation and feeding of the orange to turn the outer surface of the rind therefrom. As the orange passes beyond this medial position of first cutting engagement between the knife 130 and the rind of the fruit the roller 126 leaves engagement with the rind 92 and the periphery of the rear guard roller 127 rides in the furrow made by the knife 130 in the rind 92 during the immediately preceding revolution of the orange 91. In this manner the plunger head 125 follows the receding contour of the rear portion of the orange 91 and turns a wide band 138 of the surface of the rind 92 therefrom down to a button 137 at the rear end of the orange. This operation is repeated upon each orange passing by the plunger head 125.

The plunger head 140 maintained upon the plunger 141 of the knife holder 99 carries the same elements maintained upon the end thereof as the plunger head 125. The advance guard roller 142, however, is of smaller diameter than the rear guard roller 143 while the knife 144 is mounted on the plunger head 140 adjacent to the advance guard roller instead of adjacent to the rear guard roller, as upon the plunger head 125. This reversal in the manner of mounting the guard rollers and knife element upon the plunger head 140 from that followed in mounting the same elements upon the plunger head 125 has the effect of causing the knife 144 to engage the rind of the orange 91 upon first contact of the orange 91 against the advance guard roller 142.

As the orange is fed forwardly in the direction of the arrow 135 the advance guard roller 142 rides upon the rind 92 in a manner to yieldably force the plunger head 140 outwardly and cause the knife to turn the outer surface of the rind from the forward half of the orange leaving a forward button 145 and continuing to the middle of the orange where the knife 130 begins paring. This causes a complete denuding of the orange of the outer surface of its rind with the exception of the rear button 137 and the forward button 145. Means for removing these buttons will be described later in connection with the description of the process for completely separating the orange into its marketable component elements.

Upon the arrival of the knife 144 at the central portion of the rind 92 the rear guard roller 143 bears in the trough left by the turning of the rind from the orange and as the knife 144 passes by the point of greatest diameter the rear guard roller 143 lifts the knife 144 from engagement with the orange and maintains it out of engagement therewith while it passes over the rear half of the orange which has already been denuded of the outer surface of its rind by the knife 130.

In this manner knives 130 and 144, guided by the rollers upon their respective plunger heads 125 and 40 and urged inwardly by springs 119 in their respective knife holders 98 and 99, cooperate to remove the outer surface of the rind from the orange fed through the cutting zone.

The knives 130 and 144 are disposed beneath the plunger heads 125 and 140 and as the orange rotates in the direction of the arrow 136 the outer rind is turned therefrom and passes downwardly, as shown in Fig. 4, into a hopper 150 mounted over an opening 151 formed in the lower part of the housing 95 by means of bolts 152, which pass through the adjoining edges of the housing 95, packing 153 and flanges 154 provided upon the hopper 150. The front face 155 of the hopper 150 is hingedly supported at 156 so as to swing outwardly at a given pressure of accumulated rind turnings 157 allowing the accumulated turnings to fall downwardly into a receptacle or conveyor provided to receive them.

The chain 61 which passes around and drives the sprockets 60 mounted in the pulleys 57, 58 and 59 is maintained in engagement with these sprockets 60 during changes in their relative positions, by an idler pulley 160. This idler is mounted for rotation upon a bell crank 161 mounted pivotally at 162 upon the frame leg 16, as shown in Fig. 6. A restraining link 163 is pivotally mounted upon an end of the bell crank 161 and is adapted to restrain the idler 160 in a series of definite positions determined by the engagement of notches 164 with a pin 165 provided upon the opposite frame leg 16. By means of a handle 166 the link 163 may be manually moved from the position of engagement of a given notch 164 with the pin 165 to a position where another notch 164 engages with the pin 165, this either moving the idler 160 in a manner to loosen or tighten the chain 61, depending upon whether it is moved downwardly or upwardly.

As previously described, the rind 92 of the orange is punctured many thousand times during its rotation while in the cutting zone and incidental to the changes in pressure to which it is subjected after being punctured a large portion of the oils residing in the rind is pressed therefrom. Also, it will be seen by reference to Fig. 10, that in the turning of the outer portion of the rind from the orange oil bearing sacs 170 are opened, releasing the oil imprisoned therein. Two separate or cooperating processes for capturing the oil so released are illustrated in the drawings in Figs. 1 and 2.

The process of capturing rind oils in which the conveying medium is air or a similar gas will be first described. This process comprises the air circuit 5 in which the air or other conveying gas is continuously circulated by means of the fan 7. The enclosed space 173 in which the turning of the rind from the oranges occurs is included as a part of this circuit. The path of the conveying medium through this circuit is indicated by arrows 174. Beginning with the space 173 the circuit may be traced outwardly therefrom through conduit 176 to an end 177 of the condenser 6, through the condenser to the opposite end 179 which is connected with the intake of the fan 7. The outlet 180 of the fan 7 is connected with a conduit 181. This conduit leads to the heater 8 from which a conduit 183 leads to the chamber 173. The end of the conduit 183 is threadedly received in a central aperture formed in the boss 104 of the attachment plate 100. Into the opposite end of this aperture is threaded a nozzle 185 having a conical screen 186 secured in the end thereof to prevent any solid matter being thrown from the rollers 20, 21 and 22 into the opening of the nozzle 185. When a circulation of air is set up in the direction of the arrows 174 by the operation of the fan 7 by the motor 187, a stream of air will be directed from the nozzle 185 towards the orange in the process of having the outer rind turned therefrom. The same quantity of air which is projected from the nozzle 185 is drawn into the opening 186 connecting with the conduit 176 and returns to the fan 7 through the condenser 6. In passing from the fan 7 to the nozzle 185 the air is heated by the electric heater 8 so that upon striking the rollers and oranges, which are coated with the rind oil removed from the oranges, the volatile rind oil is quickly evaporated and absorbed in the air and passes off with the air when it is withdrawn from the chamber through the conduit 176. This air, fat with vapors of rind oil, enters the end 177 of the condenser 6 and passes through the condenser in circuitous route, as indicated by the arrows shown. In this passage the conveying air is cooled to the point where the vapors carried thereby are condensed and flow through openings 188 into a cooling channel 189 and from the channel 189 they flow into a duct 190 which connects with a reservoir 191 disposed in the brine tank 192 surrounding the cooling chamber 193 of the condenser 6. The air coming from the condenser 6 at the end 179 thereof is almost completely free from rind oil vapors. However, if any rind oil vapors remain therein they will not be lost, but will continue in the air circuit through the conduit 181, the heater 182, the conduit 183 and will be projected through the nozzle 185 into the chamber 173.

The process illustrated diagrammatically in Fig. 1 separates the orange into the following constituents: outer rind, rind oil, juice, and pectin bearing inner rind with pulpy interior juice-bearing structure desiccated of juice. The manner of capturing the rind oils given off during the puncturing and rind turning operation by means of an air circuit has just been described. However, some rind oils still remain in the peeling after it has been turned from the oranges, and these oils are extracted by passing the peeling through the oil extractor 10 here shown as comprising a pair of rollers 195 and 196 which are yieldably urged together in such a manner as to force the remaining oil from the rind peeling leaving the rind peeling 157 substantially dry from rind oil. As a rule the rind oils which reside in the structure of the rind are heavier than those which are contained in the sacs 170. Most of the oils which are obtained through the condensing of the vapors, absorbed in the air in the chamber 173, are oils liberated from the sacs 170, as illustrated in Fig. 10. These oils are considerably lighter in color and have much greater volatility than the oils which are obtained by pressure from passing the peeling 157 through the oil extractor 10. These two grades of oil may be sold separately to the trade or mixed, depending upon the individual demands of the consumer.

The water circuit 9 for capturing the rind oils liberated in the peeling operation is installed in the front portion of the housing 95, as illustrated in Figs. 1, 2 and 3. In this process a device 199 is provided for yieldably holding a brush 200 in engaging relation to oranges fed between the rollers 20, 21 and 22. This device 199 is identical with the knife holders 98 and 99 with the exception that a plunger head which is screwed into the front end of the plunger rod 118 carries the brush 200 at its tip. Also a duct leads through the center of the plunger rod 118 and connects with a duct passing through the plunger head and having an opening adjacent to the brush 200. Water is admitted into the upper end of the plunger 118 by a flexible tube 201. As shown in Fig. 1, this flexible tube connects to an outlet faucet 202 of a movable container 203 which is placed upon a stand 204 situated above the peeler 1. During the operation of the machine the faucet 202 is opened so that water may flow from the container 203 through the tubing 201 into the brush holder 199. Passing through the plunger of the brush holder 199 the water impinges upon the brush 200 wetting the same. A valve 199ª is provided to control the flow of water from the tube 201 to the brush 200.

A band of needles 205 is provided upon each of the rollers 20, 21 and 22 opposite the position at which the citrus fruit is engaged by the brush 200. These needles puncture the surface of the orange many thousand times before it has passed the brush 200. The brush 200, constantly wet with water from the container 203, washes off the rind oil liberated in the piercing and bending operations of the orange rind between the rollers. The emulsion of water and oil is flung outwardly by the rotating roller against the interior of the housing 95 and drains downwardly through a sump 206 through a conveying tube 207 into a lower container 208 similar to the container 203. When, during the operation, the container 203 shall have been emptied of water, the faucet 202 thereof is closed and the tube 201 disconnected therefrom; the faucet 209 in the tube 207 is then closed. The full container 208 is placed upon the stand 204 and the faucet 210 thereof connected with the tube 201 and opened.

The empty container 203 then takes the place of the container 208 and receives the draining water and oil through the tube 207. The containers 203 and 208 are preferably of glass, this permitting the operator of the machine to note the collection of oil in the mixture of oil and water which is being continuously passed over the orange fed through the machine. It is not absolutely essential to use water for washing the oil from the oranges. If water is not used, a subsequent separation of water and oil is eliminated.

When a certain amount of oil is collected in the operation just described the full container 203 or 208 is removed from the circuit and the oil separated from the sludge of water and oil in the container, and another container of fresh water is introduced into the circuit.

It is preferable that the water process of recovering oils from the rind of the oranges be used in conjunction with the air process in the manner illustrated in Figs. 1 and 2. However, sufficient results may be attained with citrus fruit of certain characteristics that would permit the air process to be operated separately for the capturing of rind oils as above described.

Referring to Fig. 10, wherein the cutting action of a loop knife 130 is illustrated it will be noted that the larger portion of the outer or oil-bearing rind is cut from the orange, but that a small portion 215 of this rind is left, as shown, upon the orange. Between this portion 215 and the inner fibrous juice bearing structure 216 of the orange is the pectin bearing secondary rind 217. While my invention shows but one set of knives for performing one turning operation over the larger portion of the outer surface of an orange, it is to be understood that I may employ several sets of knives and make several turning operations upon the orange so that in the first operation the outer half of the outer rind may be removed, in the next operation the inner half 215 of the outer rind may be removed, and in the final operation, the secondary pectin bearing rind 217 may be removed. This would practically clean the inner juice bearing structure of the orange from rind, excepting the end buttons. It has been found in practice that the membranes bounding the juice bearing structure 216 are very tough and resistant to the cutting action of the loop style of knives such as knives 130 and 144. This makes it possible to cut the pectin bearing secondary rind right down to the outer membrane. The depth of cut taken by the knives 130 and 144 may also be adjusted so that the entire outer rind may be removed in a single turning.

The end remover 2, as illustrated in Figs. 1, 2, 6, 7, 12, 13 and 14 is adapted to remove the outer rind from the end buttons 137 and 145 to a given depth. The same type of knife and yielding holder as employed in the peeler is used here, though the rotating and feeding means are entirely unique.

Pulleys 57 and 59 have reduced diameter extension driving pulleys 218 and 219 provided upon their respective outer ends. The peripheral speed of the pulley 218 is slightly greater than that of the pulley 219 due to the pulley 218 being slightly larger in diameter than the pulley 219.

Rotatably mounted upon a rigid frame arm 220 and disposed a distance from and opposite the pulley 218, is a belt terminal idler 221. Similarly mounted on the arm 220 opposite and spaced from the pulley 219 is a belt terminal idler 222. A belt 225, preferably of a flexible nature, passes around and is stretched taut by the extension pulley 218 and the belt terminal idler 221. A similar belt 226 passes in the same manner around the extension pulley 219 and belt terminal idler 222. Terminal idlers 221 and 222 are disposed so that the line drawn from the axis of each through the axis of its driving pulley 218 or 219 is perpendicular to the line passing through the axes of the two driving pulleys 218 and 219. This relative position of the driving and idling pulleys causes the flat portions of belts 225 and 226 to be substantially parallel and the space 227 between the confronting flat faces 228 and 229 thereof to be of maximum depth.

As is well shown in Fig. 6, the confronting flat belt portions 228 and 229 move in opposite directions due to the rotation of driving pulleys 218 and 219 in the same direction. Also, belt portion 228 moves slightly faster in the direction of an arrow 230 than the belt portion 229 moves in the direction of an arrow 231, due to the diameter of the driving pulley 218 being slightly larger than that of the driving pulley 219 and the driving pulleys 218 and 219 being rotated the same number of R. P. M.

In Fig. 6, an orange 235 is shown as being fed outwardly at the rear of the peeler 1 between the pulleys 57, 58 and 59. As it reaches the rear end of these pulleys it will engage flat belt portions 228 and 229. These belt portions will be traveling at approximately the same speed and direction as the surface of the orange contacting with them. Thus, the orange 235 will distend the flexible belt portions 228 and 229 so as to enter the space 227 therebetween.

Due to the opposite direction of movement of these belt portions the orange will continue to be rotated thereby. Also, as soon as discharged from between the pulleys 57, 58 and 59, the orange will be fed, while being rotated, in the direction of the arrow 230 due to the speed of the belt portion 228, engaging the upper half of the orange 235, being greater than the belt portion 229 engaging the lower half thereof.

Thus, as the orange 235 is rotated and fed in the direction of the arrow 230 it will reach the position of the orange 236 as shown in Figs. 2, 6, 12, 13 and 14. In Figs. 2, 6 and 12 the orange 236, denuded of the medial portion of its outer rind, is just entering engagement with cutting elements 240 and 241 in a manner which will result in the removing of the outer rind from the end buttons 137 and 145 to a predetermined depth.

These cutting elements 240 and 241 are identical with cutting elements formed upon the plunger heads 125 and 140 and are yieldably mounted upon holders 242 and 243 which are identical in structure with holders 98 and 99. Holders 242 and 243 are so mounted upon the frame arms 244 and 245, respectively, as to permit the cutting elements 240 and 241 to be yieldably projected inwardly into the path of the oranges fed between belt portions 228 and 229, and so as to engage the end buttons of rind remaining upon the oranges. This engagement is illustrated in plan in Fig. 12 and shows cutting elements 240 and 241 riding upon end buttons by means of guide rollers 248 while knives 249 peel off the end button rind in a continuous string as the orange is concurrently rotated and fed in the direction of an arrow 250.

A following guide roller 251 is disposed upon cutting elements 240 and 241 co-axial with and opposite from guide roller 248. When the knives 249 reach the axis of rotation of the oranges 236, they have completely removed the end button rind. Here the following guide rollers 251, which are slightly larger than the rollers 248, engage the orange and hold the knives 249 out of further engagement with the surface of the orange. The mountings of the terminal idlers 221 and 222 upon the frame arm 220 comprise shafts 220ª which pass through slots 220ᵇ in the frame arm 220 and are adjustably secured therein by nuts 220ᶜ threadedly received upon the inner ends of the shafts 220ª. This manner of mounting the terminal idlers 221 and 222 permits their positions to be readily adjusted relative to their respective driving pulleys 218 and 219 when the latter are displaced by any adjustment of the front or rear journal bushings 26 of the rollers 20, 21 and 22.

The string of rind as it is peeled off, falls in the mouths of conveying conduits 252, shown in Figs. 1 and 2, and for the sake of clearness, not shown in Fig. 6. The showing of conduits 252 is diagrammatic in nature and used only to indicate means of conveying the rind peeled from the end buttons to the conveying means indicated by chute 253 through which they will be conducted, with the rind peelings removed in peeler 1 to the pressure oil extractor 10.

In Figs. 13 and 14 the orange 236 is shown in engaging relation with a modified form of end button rind remover 255. This comprises opposite spring guide arms 256 secured to frame members 257, and adapted to be sprung apart by an advancing orange, so that knives 258, provided upon the forward ends of the arms 256, will be positioned for cutting the outer rind from the end buttons 137 and 145 of the orange 236. The forward ends of spring guide arms 256, to the rear of knives 258, are out bent to form a space 260 through which rind peelings may drop, when completely severed from the orange 236, into suitable conveying means which may be provided to carry them to the rind oil pressure extractor 10. Steadying tongues 261 are provided upon the arms 256, opposite openings 260, and are slidably received in slots 262 formed in suitably disposed frame members 263. These tongues permit lateral movement of the knives 258 but prevent other undesirable displacement of these knives. When the axis of rotation of the orange crosses the cutting edge of the knives 258, the outer rind of the end buttons is entirely removed and falls through the openings 260. The knives 258 then ride over the receding contour of the orange without engagement therewith due to the reverse direction of movement of the following surface of the orange relative to the knives, this being made obvious by reference to Fig. 14.

Referring now to Fig. 6, it will be noted that the distance between the terminal idler 222 and its driving pulley 219 is shorter than that between the idler 221 and the pulley 218. Thus, an easy exit for the oranges from between the belt portions 228 and 229 is provided as the idler 222 is disposed opposite a point in the flat belt portion 228 which is so far towards the center thereof from the idler 221 that the belt portion 228 will yield to permit the orange to pass over the portion of the belt 226 engaging with the unyielding idler 22.

No housing for the end remover 2 is shown in the drawings, but it is to be understood that a housing and means for capturing rind oils similar to that provided in the structure of the peeler 1 may be employed to cover the end remover 2, and capture the oils released by cutting the rind from the orange end buttons.

In fact the rotating and feeding mechanism embodied in the end remover 2 might, within the scope of the present invention, be adapted for use in a peeler as diagrammatically illustrated in Fig. 15. Here the belts 270 and 271 pass around pulleys 272 and are rotated in identically the same manner as belts 225 and 226 in end remover 2. This mechanism is then enclosed in a housing 275 which confines the volatile oils released by knives 276, operating upon the rind of the oranges 277. An air inlet 278 and an air outlet 279 are provided in the housing 275 to connect the space confined therein in an oil condensing circuit similar to circuit 5. Needle points 280 may be provided in belts 270 and 271 for puncturing the rinds of oranges fed therebetween to aid in the release of rind oils.

The difficulty in former attempts to separate the pectin bearing secondary rind from the citrus fruit was that this inner rind adheres firmly to the outer oil bearing rind and my process is the only one devised whereby this separation may be economically accomplished.

In the operation of this machine, as herein shown and described, from sample runs of oranges I have obtained 40% of the weight of the oranges in pectin bearing fibre, 10% in ribbon peel, approximately 49% in orange juice and 1% in rind oil. The most practical speed I have found for rotating the rollers 20, 21 and 22 is 900 R. P. M.

Referring to Fig. 8, it will be noted that the forward portions 350 of the rollers 20, 21 and 22 are slightly tapered, this being for the purpose of making it easier to feed citrus fruit into the front end of the space 25 by hand; this tapering assists in compensating for slight variations in diameters of the fruit fed and avoids rupture of the rind by engagement with a sharp edge of the end of the roller, which might happen if the roller were continued uniform in diameter up to the front end thereof. The tapered portions 350 gradually apply pressure to an orange being inserted between the rollers 20, 21 and 22 and gradually transform it into proper shape for subsequent operations thereupon.

I claim as my invention:

1. In a machine of the class described, the combination of: means for rotating and feeding an object along a given path by contact with the surface of said object; means for removing a central portion of the skin of said object as it is fed by said first-named means; and means for subsequently removing the end portions of the skin of said object.

2. In a machine of the class described, the combination of: non-yielding compressing means for rotating and feeding an object along a given path by contact with the surface of said object, said object being fed in a direction of the length of said means relative to said means; and means for removing a portion of the surface of said object.

3. A machine of the class described, comprising: means for rotating a fruit by contact only with the outer surface of the fruit; and means for removing a central portion of the skin therefrom as said fruit is rotated and fed; and means for removing end portions from said fruit after a portion of the skin has been removed therefrom.

4. A machine of the class described, comprising: non-yielding compressing means for rotating a fruit and feeding same along a given path; and means contacting with a bulged portion of said fruit between said compressing means for removing a central portion of the skin therefrom as said fruit moves thereby.

5. A machine of the class described, comprising: means for rotating a fruit and feeding same along a given path; means for removing a central portion of the skin therefrom as said fruit moves thereby; a second means for rotating said fruit independently of said first named means; and means for removing end portions from said fruit while rotated by said second named rotating means.

6. A machine of the class described, comprising: a plurality of non-yielding compressing rollers placed in substantially circular arrangement; means for rotating said compressing rollers in order to cause said rollers to compress, rotate and feed an object therebetween; and means acting upon a bulged portion of said object for removing a portion of the skin of said object as it is fed between said compressing rollers.

7. A machine of the class described, comprising: a plurality of rollers placed in substantially circular arrangement; means for rotating said rollers in order to cause said rollers to rotate and feed an object therebetween; means for adjusting the positions of said rollers to increase or decrease the feed of an object therebetween; and means for removing a portion of the skin of said object as it is fed between said rollers.

8. A machine of the class described, comprising: a plurality of rollers placed in substantially circular arrangement; means for rotating said rollers in order to cause said rollers to rotate and feed an object therebetween; means for adjusting the axes of said rollers relative to each other to accommodate different sized objects; and means for removing a portion of the skin of said object as it is fed between said rollers.

9. A machine of the class described, comprising: a plurality of rollers placed in substantially circular arrangement means for rotating said rollers in order to cause said rollers to rotate and feed an object therebetween; means for adjusting the positions of said rollers to increase or decrease the feed of an object therebetween; means for adjusting the positions of said rollers to accommodate different sized objects; and means for removing a portion of the skin of said object as it is fed between said rollers.

10. A combination as defined in claim 6 in which said rollers are deviated from parallelism with the path of said object.

11. A machine of the class described, comprising: a plurality of non-yielding compressing rollers placed in substantially circular arrangement; means for rotating said rollers in order to cause said rollers to compress, rotate and feed an object therebetween; and a knife acting upon a bulged portion of said object and adapted to remove a portion of the skin of said object as it is fed between said compressing rollers.

12. A machine of the class described, comprising: a plurality of rollers placed in substantially circular arrangement; means for rotating said rollers in order to cause said rollers to compress, rotate and feed an object therebetween; means for adjusting the positions of said rollers to increase or decrease the feed of an object therebetween; and a knife acting upon a bulged portion of said object and adapted to remove a portion of the skin of said object as it is fed between said compressing rollers.

13. A machine of the class described, comprising: a plurality of rollers placed in substantially circular arrangement; means for rotating said rollers in order to cause said rollers to compress, rotate and feed an object therebetween; means for bodily adjusting the positions of said rollers to accommodate different sized objects; and a knife acting upon a bulged portion of said object and adapted to remove a portion of the skin of said object as it is fed between said compressing rollers.

14. A machine of the class described, comprising: a plurality of rollers placed in substantially circular arrangement; means for rotating said rollers in order to cause said rollers to compress, rotate and feed an object therebetween; means for adjusting the positions of said rollers to increase or decrease the feed of an object therebetween; means for adjusting the positions of said rollers to accommodate different sized objects; and a knife acting upon a bulged portion of said object and adapted to remove a portion of the skin of said object as it is fed between said compressing rollers.

15. A machine of the class described, comprising: a plurality of rollers placed in substantially circular arrangement; means for rotating said rollers in order to cause said rollers to rotate and feed an object therebetween; and a plurality of knives each adapted to remove a different portion of the skin of said object as it is fed between said rollers.

16. A machine of the class described, comprising: a plurality of rollers placed in substantially circular arrangement; means for rotating said rollers in order to cause said rollers to rotate and feed an object therebetween; means for adjusting the positions of said rollers to increase or decrease the feed of an object therebetween; means for adjusting the positions of said rollers to accommodate different sized objects; and a plurality of knives each adapted to remove a different portion of the skin of said object as it is fed between said rollers.

17. A machine of the class described, comprising: a plurality of rollers placed in substantially circular arrangement; means for rotating said rollers in order to cause said rollers to rotate and feed an object therebetween; a knife adapted to remove a portion of the skin of said object as it is fed between said rollers; and means contacting said object for causing said knife to follow the contour of said object.

18. A machine of the class described, comprising: a plurality of compressing rollers of substantially uniform diameter placed in substantially circular arrangement; means for rotating said rollers in order to cause said rollers to compress, rotate and feed an object therebetween; means carried by said compressing rollers for frictionally engaging said object; and means acting upon a bulged portion of said object for removing a portion of the skin of said object as it is fed between said compressing rollers.

19. A machine of the class described, comprising: a plurality of compressing rollers of substantially uniform diameter placed in substantially circular arrangement; means for rotating said rollers in order to cause said rollers to compress, rotate and feed an object therebetween; means carried by said compressing rollers for frictionally engaging said object; means for adjusting the positions of said compressing rollers to increase or decrease the feed of an object therebetween; and means acting upon a bulged portion of said object for removing a portion of the skin of said object as it is fed between said compressing rollers.

20. A machine of the class described, comprising: a plurality of compressing rollers of substantially uniform diameter placed in substantially circular arrangement; means for rotating said rollers in order to cause said rollers to compress, rotate and feed an object therebetween; means carried by said compressing rollers for frictionally engaging said object; and a knife acting upon a bulged portion of said object and adapted to remove a portion of the skin of said object as it fed between said compressing rollers.

21. A machine of the class described, comprising; a plurality of compressing rollers of substantially uniform diameter placed on substantially circular arrangement; means for rotating said rollers in order to cause said rollers to compress, rotate and feed an object therebetween; means carried by said compressing rollers for frictionally engaging said object as it is fed between said rollers; means for adjusting the positions of said rollers to accommodate different sized objects; and a knife acting upon a bulged portion of said object and adapted to remove a portion of the skin of said object as it is fed between said compressing rollers.

22. A machine of the class described, comprising; a plurality of compressing rollers of substantially uniform diameter placed in substantially circular arrangement; means for rotating said rollers in order to cause said rollers to compress, rotate and feed an object therebetween; means carried by said compressing rollers for frictionally engaging said object; a knife acting upon a bulged portion of said object and adapted to remove a portion of the skin of said object as it is fed between said compressing rollers; and means for causing said knife to follow the contour of said object.

23. A machine of the class described, comprising: a plurality of rollers placed in substantialy circular arrangement; means for rotating said rollers in order to cause said rollers to rotate and feed an object therebetween; means carried by said rollers for frictionally engaging said object; means for adjusting the positions of said rollers to increase or decrease the feed of an object therebetween; means for adjusting the positions of said rollers to accommodate different sized objects; a knife adapted to remove a portion of the skin of said object as it is fed between said rollers; and means for causing said knife to follow the contour of said object.

24. A machine of the class described, comprising: a plurality of rollers placed in substantially circular arrangement; means for rotating said rollers in order to cause said rollers to rotate and feed an object therebetween; means for removing a portion of the skin of said object; and means for removing end portions of the skin of said object as it leaves the machine.

25. A machine of the class described, comprising: a plurality of rollers placed in substantially circular arrangement; means for rotatng said rollers in order to cause said rollers to rotate and feed an object therebetween; means for adjusting the positions of said rollers to increase or decrease the feed of an object therebetween; means for removing a portion of the skin of said object as it is fed between said rollers; and means for removing end portions of the skin of said object as it leaves the machine.

26. A machine of the class described, comprising: a plurality of rollers placed in substantially circular arrangement; means for rotating said rollers in order to cause said rollers to rotate and feed an object therebetween; means carried by said rollers for frictionally engaging said object; means for adjusting the positions of said rollers to accommodate different sized objects; a knife adapted to remove a portion of the skin of said object as it is fed between said rollers; and means for removing end portions of the skin of said object as it leaves the machine.

27. A machine of the class described, comprising: a plurality of rollers placed in substantially circular arrangement; means for rotating said rollers in order to cause said rollers to rotate and feed an object therebetween, means carried by said rollers for frictionally engaging said object; a knife adapted to remove a portion of the skin of said object as it is fed between said rollers; means for causing said knife to follow the contour of said object; and means for removing end portions of the skin of said object as it leaves the machine.

28. A machine of the class described, comprising a plurality of rollers placed in substantially circular arrangement; means for rotating said rollers in order to cause said rollers to rotate and feed an object therebetween; means for removing a portion of the skin of said object as it is fed between said rollers; a conveying arrangement placed at the exhaust end of said rollers, said conveying arrangement adapted to convey said object from said rollers; and end removing knives arranged to remove the end skin portions from said object as it is carried by said conveying arrangement.

29. A machine of the class described, comprising: a plurality of rollers placed in substantially circular arrangement; means for rotating said rollers in order to cause said rollers to rotate and feed an object therebetween; means for adjusting the positions of said rollers to increase or decrease the feed of an object therebetween; means for removing a portion of the skin of said object as it is fed between said rollers; a conveying arrangement placed at the exhaust end of said rollers, said conveying arrangement adapted to convey said object from said rollers; and end removing knives arranged to remove the end skin portions from said object as it is carried by said conveying arrangement.

30. A machine of the class described, comprising: a plurality of rollers placed in substantially circular arrangement; means for rotating said rollers in order to cause said rollers to rotate and feed an object therebetween; a knife adapted to remove a portion of the skin of said object as it is fed between said rollers; a conveying arrangement placed at the exhaust end of said rollers, said conveying arrangement adapted to convey said object from said rollers; and end removing knives arranged to remove the end skin portions from said object as it is carried by said conveying arrangement.

31. A machine of the class described, comprising: a plurality of rollers placed in substantially circular arrangement; means for rotating said rollers in order to cause said rollers to rotate and feed an object therebetween; a plurality of knives each adapted to remove a different portion of the skin of said object as it is fed between said rollers; a conveying arrangement placed at the exhaust end of said rollers, said conveying arrangement adapted to convey said object from said rollers; and end removing knives arranged to remove the end skin portions from said object as it is carried by said conveying arrangement.

32. A machine of the class described comprising: a plurality of rollers placed in substantially circular arrangement; means for rotating said rollers in order to cause said rollers to rotate and feed an object therebetween; a knife adapted to remove a portion of the skin of said object as it is fed between said rollers; means for causing said knife to follow the contour of said object; a conveying arrangement placed at the exhaust end of said rollers, said conveying arrangement adapted to convey said object from said rollers; and end removing knives arranged to remove the end skin portions from said object as it is carried by said conveying arrangement.

In testimony whereof, I have hereunto set my hand at Los Angeles, California, this 2nd day of July, 1925.

HASTINGS M. SHIELDS